US011461067B2

(12) United States Patent
Nagar et al.

(10) Patent No.: US 11,461,067 B2
(45) Date of Patent: Oct. 4, 2022

(54) SHARED INFORMATION FIELDS WITH HEAD MOUNTED DISPLAYS

(71) Applicant: International Business Machines Corporation, Armonk, NY (US)

(72) Inventors: Raghuveer Prasad Nagar, Kota (IN); Sarbajit K. Rakshit, Kolkata (IN); Subba Rayudu Tangirala, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/125,584

(22) Filed: Dec. 17, 2020

(65) Prior Publication Data

US 2022/0197585 A1     Jun. 23, 2022

(51) Int. Cl.
*G06F 3/14* (2006.01)
*G06F 3/0481* (2022.01)
(Continued)

(52) U.S. Cl.
CPC .......... *G06F 3/1454* (2013.01); *G06F 3/0481* (2013.01); *G06F 3/04842* (2013.01);
(Continued)

(58) Field of Classification Search
CPC .... G06F 3/1454; G06F 3/0481; G06F 3/0482; G06F 2203/04803; H04L 65/403; H04L 67/306
See application file for complete search history.

(56) References Cited

U.S. PATENT DOCUMENTS 9,582,770 B2 *   2/2017   Zeng ................. H04L 51/02
10,467,630 B2 *  11/2019  Iyer ................ G06Q 30/016
(Continued)

FOREIGN PATENT DOCUMENTS

WO      2019237085 A1    12/2019

OTHER PUBLICATIONS

Butz, et al., "Enveloping Users and Computers in a Collaborative 3D Augmented Reality", Proceedings 2nd IEEE and ACM International Workshop on Augmented Reality (IWAR'99), Oct. 20-21, 1999, 3 pages, <https://ieeexplore.ieee.org/document/803804>.

*Primary Examiner* — Tadesse Hailu
(74) *Attorney, Agent, or Firm* — Edward J. Wixted, III

(57) ABSTRACT

Disclosed are techniques for classifying and displaying electronic data sets relevant to a collaboration context using head mounted displays. Context information corresponding to a collaboration event is leveraged to identify participants for the collaboration event, where natural language processing is applied across the contents of electronic data sets presently available to the participants across their computer devices and network-based storage environments to collect electronic data sets relevant to the collaboration event. The collected data sets are then classified, from the perspective of individual participants, into classes including previously known and previously unknown data sets. The collected data sets are then displayed based on their classes to the participants wearing head mounted displays such that each participant views the same overall set of data sets through their head mounted display, but the data sets displayed within each class may differ between them.

14 Claims, 7 Drawing Sheets

(51) Int. Cl.
*H04L 65/403* (2022.01)
*H04L 67/306* (2022.01)
*G06F 3/04842* (2022.01)

(52) U.S. Cl.
CPC .......... *H04L 65/403* (2013.01); *H04L 67/306* (2013.01); *G06F 2203/04803* (2013.01)

(56) References Cited

U.S. PATENT DOCUMENTS

| | | | | |
|---|---|---|---|---|
| 2002/0076025 A1* | 6/2002 | Liversidge | ............ | H04M 3/567 379/202.01 |
| 2005/0262201 A1* | 11/2005 | Rudolph | ............. | H04L 65/4038 709/205 |
| 2007/0239755 A1* | 10/2007 | Mahoney | ............. | G06Q 10/107 |
| 2007/0264956 A1* | 11/2007 | Bicker | ................... | G06Q 10/10 455/186.1 |
| 2008/0147794 A1* | 6/2008 | Limberg | .............. | G06Q 10/107 709/204 |
| 2013/0249947 A1 | 9/2013 | Reitan | | |
| 2013/0293468 A1* | 11/2013 | Perez | ...................... | G06F 21/32 345/158 |
| 2014/0025767 A1* | 1/2014 | De Kezel | ................ | H04L 51/04 709/206 |
| 2014/0075004 A1* | 3/2014 | Van Dusen | ............. | H04L 41/04 709/223 |
| 2014/0223335 A1* | 8/2014 | Pearson | ................ | G06F 3/0481 715/753 |
| 2014/0285519 A1 | 9/2014 | Uusitalo | | |
| 2014/0368537 A1* | 12/2014 | Salter | ...................... | G06F 3/011 345/633 |
| 2015/0156028 A1 | 6/2015 | Ballard | | |
| 2015/0213650 A1* | 7/2015 | Barzuza | ............... | H04N 13/332 348/14.07 |
| 2016/0027218 A1* | 1/2016 | Salter | ................... | G02B 27/017 345/633 |
| 2016/0196561 A1* | 7/2016 | Iyer | ...................... | G06Q 30/016 705/304 |
| 2016/0321562 A1* | 11/2016 | Zeng | ...................... | G06Q 10/107 |
| 2017/0316186 A1* | 11/2017 | Breitenfeld | ......... | G06F 21/6218 |
| 2018/0095616 A1* | 4/2018 | Valdivia | ................... | G06F 3/013 |
| 2019/0114802 A1* | 4/2019 | Lazarow | ................ | G06F 1/163 |
| 2019/0253667 A1* | 8/2019 | Valli | ....................... | G02B 27/017 |
| 2019/0265945 A1* | 8/2019 | Newell | ................ | G06F 3/04815 |
| 2019/0281001 A1* | 9/2019 | Miller | .................... | G06N 20/00 |
| 2020/0076746 A1* | 3/2020 | Penrose | ................. | G06N 3/08 |
| 2020/0099891 A1* | 3/2020 | Valli | ......................... | G06T 3/00 |
| 2020/0162851 A1 | 5/2020 | Wilde | | |
| 2020/0322395 A1* | 10/2020 | Copley | ................. | H04L 65/605 |
| 2020/0341882 A1* | 10/2020 | Entrekin | ............. | G06F 11/3438 |

\* cited by examiner

SHARED INFORMATION FIELDS WITH HEAD MOUNTED DISPLAYS

BACKGROUND

The present invention relates generally to the field of augmented reality, and more particularly to collaborative information sharing in augmented reality environments.

A head-mounted display (HMD) is a display device worn on the head or as part of a helmet with a small display optic positioned for viewing by one eye (in the instance of monocular HMDs) or each eye (in the instance of binocular HMDs). Augmented Reality devices and Virtual Reality devices are types of head mounted displays, which can typically deliver visual, auditory, haptic and/or other output in a fairly direct manner to the head (for example, eyes, ears) of a person.

Augmented reality (AR) systems refer to interactive experiences with a real-world environment where objects which reside in the real world are modified by computer-generated perceptual information, sometimes across two or more sensory modalities, including visual, auditory, haptic, somatosensory and olfactory. AR systems are frequently defined to require three basic features: a combination of real and virtual worlds, real-time interaction, and accurate 3D registration of virtual and real objects. The overlaid sensory information typically comes in two varieties. The first variety is constructive (i.e. additive to the natural environment), and the second variety is destructive (i.e. masking of the natural environment). This experience is smoothly interwoven with the physical world in such a way that it is frequently perceived as an immersive aspect of the real environment. In this way, AR alters a person's ongoing perception of a real-world environment, as contrasted to virtual reality which fully replaces the user's real-world environment with a simulated one. AR is related to two terms which are largely synonymous: mixed reality and computer-mediated reality. With the help of advanced AR technologies (e.g. incorporating computer vision, leveraging AR cameras into smartphone applications and object recognition) information about the surrounding real world of the AR user becomes interactive and digitally manipulated. Information about the environment and objects within it is overlaid onto the real world.

Virtual reality (VR) describes simulated experiences that can be similar to or completely different from the real world. Typical applications of VR includes entertainment (i.e. video games) and educational purposes (i.e. medical or military training). Other, distinct types of VR style technology include augmented reality and mixed reality, sometimes referred to as extended reality or XR.

A VR headset is a head-mounted device providing virtual reality for the wearer. VR headsets are frequently associated with video games, but they are also used in other applications, including simulators and trainers. Typical VR headsets comprise a stereoscopic head-mounted display (displaying separate images to each eye), stereo sound, and head motion tracking sensors (which may include gyroscopes, accelerometers, magnetometers, structured light systems etc.). Some VR headsets also have sensors for tracking eye movements.

SUMMARY

According to an aspect of the present invention, there is a method, computer program product and/or system that performs the following operations (not necessarily in the following order): (i) receiving a collaboration context data set including information indicative of a collaboration event and unique user accounts of a plurality of collaboration participants wearing head mounted displays, including a first unique user account associated with a first participant; (ii) receiving a collaboration event substantive data set including a plurality of data sets corresponding to the collaboration event from computer devices associated with the unique user accounts of the plurality of collaboration participants; (iii) for the first unique user account, classifying the data sets in the collaboration event data set into a plurality of classes, including a first class corresponding to newly introduced information and a second class corresponding to information previously accessed by the first unique user account; and (iv) displaying, on the head mounted display of the first participant, a collaboration information field including a visual representation of the collaboration event substantive data set based, at least in part, on the classified data sets.

DETAILED DESCRIPTION

Figure 1:
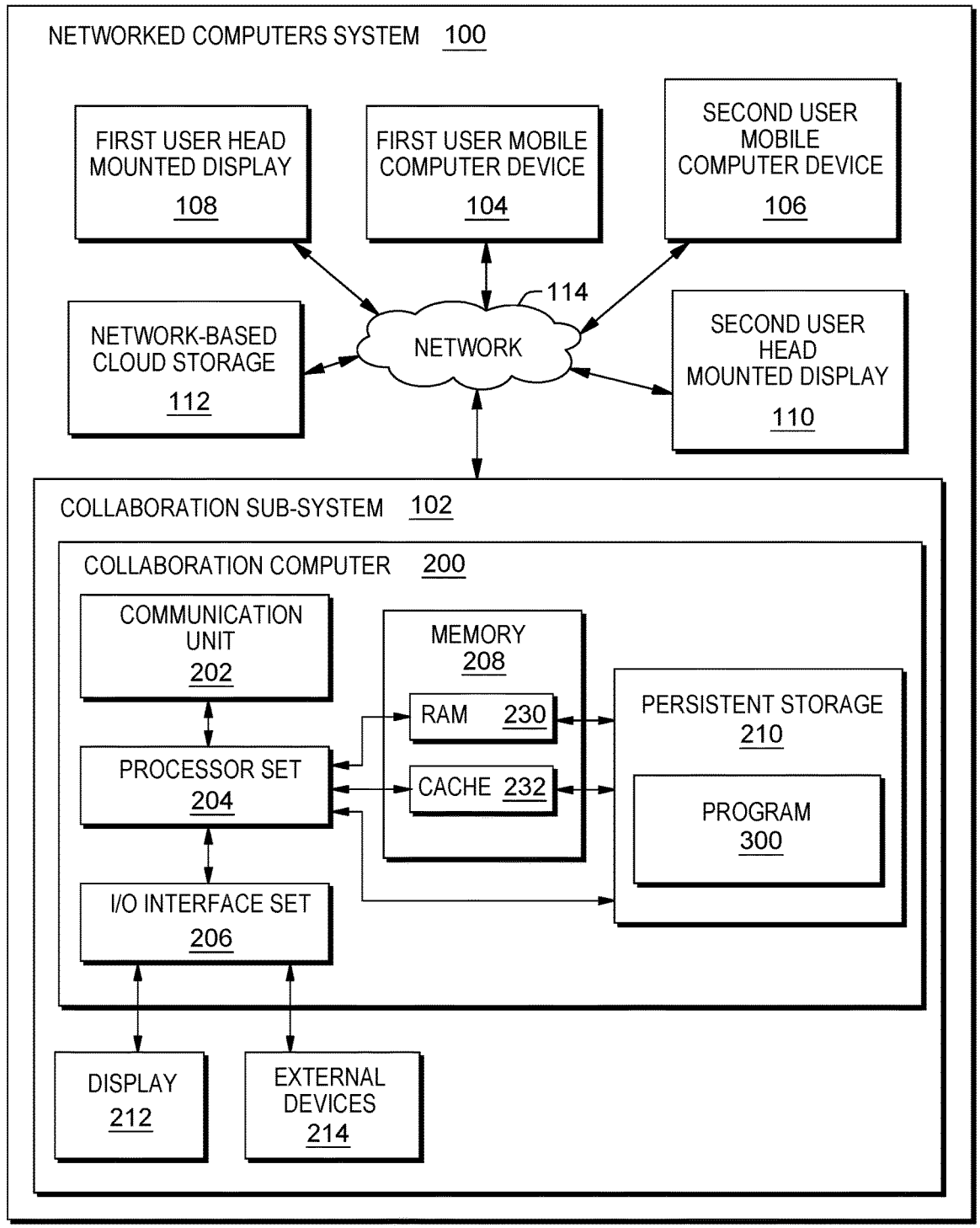
FIG. 1 is a block diagram view of a first embodiment of a system according to the present invention.

Some embodiments of the present invention are directed to techniques for classifying and displaying electronic data sets relevant to a collaboration context using head mounted displays. Context information corresponding to a collaboration event is leveraged to identify participants for the collaboration event, where natural language processing is applied across the contents of electronic data sets presently available to the participants across their computer devices and network-based storage environments to collect electronic data sets relevant to the collaboration event. The collected data sets are then classified, from the perspective of individual participants, into classes including previously known and previously unknown data sets. The collected data sets are then displayed based on their classes to the participants wearing head mounted displays such that each participant views the same overall set of data sets through their head mounted display, but the data sets displayed within each class may differ between them.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium, sometimes referred to as a machine readable storage device, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be any thing made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: collaboration subsystem 102 (sometimes herein referred to, more simply, as subsystem 102); first user mobile computer device 104; second user mobile computer device 106; first user head mounted display 108; second user head mounted display 110; network-based cloud storage 112; and communication network 114. Collaboration subsystem 102 includes: collaboration computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

First user mobile computer device 104 and second user mobile computer device 106 may be a laptop computer, tablet computer, netbook computer, personal computer (PC), a desktop computer, a personal digital assistant (PDA), a smart phone, or any other type of computer (see definition of "computer" in Definitions section, below).

First user head mounted display 108 and second user head mounted display 110 are head mounted displays with at least one optic for viewing computer generated content by at least one eye.

Network-based cloud storage 112 is a data storage environment accessed through computer network communications modeled upon typical state of the art cloud networks.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
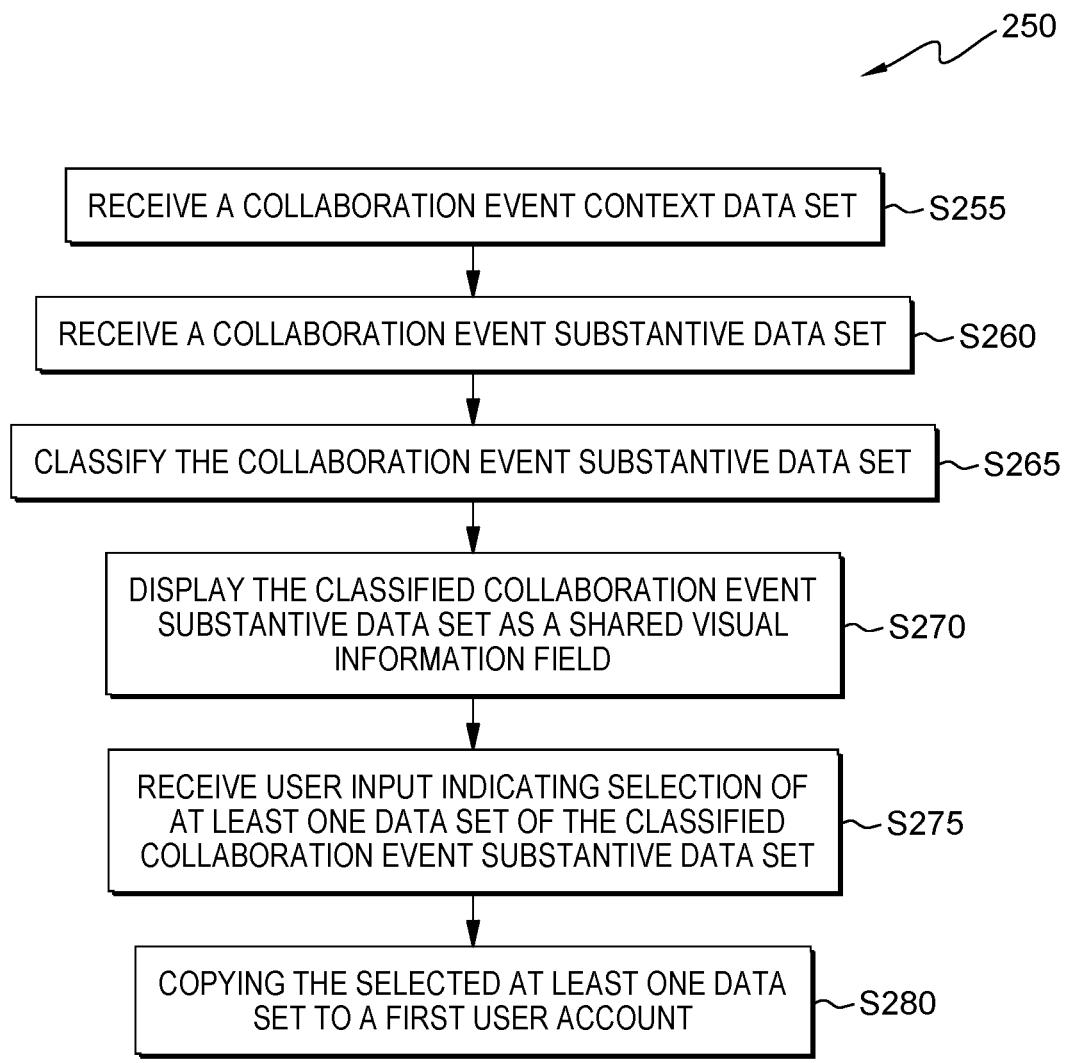
FIG. 2 is a flowchart showing a first embodiment method performed, at least in part, by the first embodiment system.
Figure 3:
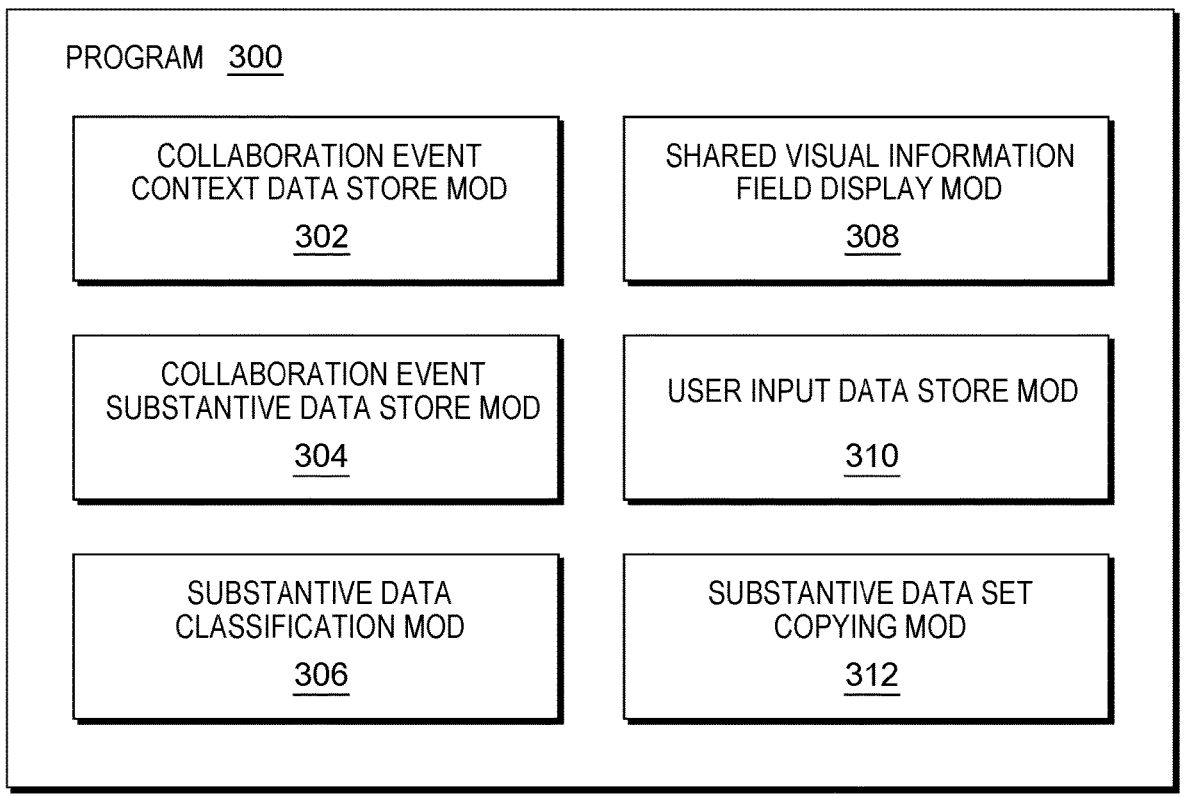
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2, 3, 4A and 4B.

Processing begins at operation S255, where collaboration event context data store module ("mod") 302 receives a collaboration event context data set. In this simplified embodiment, the collaboration event context data set includes information indicating a meeting, scheduled for Monday, Oct. 19, 2020 at 3 PM EDT with the following participants: Person A, Person B, and Person C. The collaboration event context data set also includes information indicating that the subject of the meeting is the production schedule for Widget X. Additionally, the collaboration event context data set further includes information indicating separate, unique user accounts for Person A, Person B and Person C. Each unique user account is associated with one or more computer devices, as well as access to a network-based cloud storage environment. For example, Person A has a first unique user account and Person B has a second unique user account. Accessing data sets located in the network-based cloud storage environment generates historical logs documenting which unique user account has (or has not yet) accessed a given data set, when the given data set was accessed by a given unique user account, etc. The collaboration event context data set yet further includes information indicating that Person A and Person B are participating in this collaboration event using augmented reality (AR) headsets, first user head mounted display 108 and second user head mounted display 110, respectively.

In some alternative embodiments, other types of collaboration event context information included in the collaboration event context data set may include one or more of, but not limited to, the following types of information: (i) permission levels of participants; (ii) type of collaboration event; (iii) roles of individual participants; (iv) type of head mounted displays used for the collaboration event; (v) objective of the collaboration event; and (vi) relevant timespan for data events corresponding to the collaboration event.

Processing proceeds to operation S260, where collaboration event substantive data store mod 304 receives a collaboration event substantive data set. In this simplified embodiment, the collaboration event substantive data set is received from computer devices and network-based cloud storage data sets associated with unique user accounts of participants of the collaboration event. The collaboration event substantive data set includes two data sets: (i) an e-mail addressed to Person B and Person C from Person A querying whether Widget X is behind schedule for release by Dec. 15, 2020 (referred to below for simplicity as "The E-mail"); and (ii) a report authored by Person B and communicated to Person C indicating that the most recent estimate projecting Widget X as two weeks behind schedule is obsolete, resulting from progress exceeding expectations over the previous week, and that Widget X will be ready for deployment ten days after the previously scheduled release of Dec. 15, 2020 (referred to below for simplicity as "The Report"). The E-Mail is received from: (i) first user mobile computer device 104, a mobile computer device associated with the unique user account of Person A; (ii) second user mobile computer device 106, a mobile computer device associated with the unique user account of Person B; and (iii) network-based cloud storage 112, where the unique user accounts of Person A and Person B have individual storage capacity assignments for storing data sets, corresponding to logical partitions where a unique user account can upload, view, or download data sets. The Report is received from: (i) second user mobile computer device 106, a mobile computer device associated with the unique user account of Person B; and (ii) network-based cloud storage 112, where the unique user accounts of Person C and Person B have individual storage capacity assignments for storing data sets, corresponding to logical partitions where a unique user account can upload, view, or download data sets. In this simplified embodiment, the types of data sets that may be included in the collaboration event substantive data set are any type of electronic data capable of storage on computer readable storage media.

In some alternative embodiments, the data sets received as part of the collaboration event substantive data set are received by applying natural language processing techniques, to both syntax and semantics, upon all of the data sets stored on computer devices or accessible by unique user accounts of some or all of the collaboration event participants. Communications to or from collaboration event participants are processed to determine certain words identifying relevant information to the collaboration event, which are then used to further identify other data sets containing relevant information, received as part of the collaboration event substantive data set. Random forest based ensemble learning is one example technique used to classify collaboration event substantive data sets. In another alternative embodiment, collaboration event participants select some or all of the data sets to be received as part of the collaboration event substantive data set.

Processing proceeds to operation S265, where substantive data classification mod 306 classifies the collaboration event substantive data set. In this simplified embodiment, data sets corresponding to substantive information relating to the collaboration event are classified into two classes for each participant of the collaboration event: (i) new information; and (ii) known information. Known information includes data sets that have been previously accessed, or transmitted to, or stored upon a given unique user account, computer devices associated with the given unique user account, or network based cloud storage capacity. If a data set has been previously accessed, or transmitted to, or stored upon a given unique user account, computer devices associated with the given unique user account, or network based cloud storage capacity, some embodiments of the present invention presume that the user or person associated with the given unique user account has consumed or knows the contents of the data set. In this simplified example embodiment, the collaboration event substantive data set includes two data sets: (i) The E-mail; and (ii) The Report. Substantive data classification mod 306 applies classification to each data set in the collaboration event substantive data set for each unique user account of the participants of the collaboration event as indicated in the received collaboration event context data set. In this example, for the unique user account corresponding to Person A, The E-mail is classified as known information, and The Report is classified as new information. For the unique user account corresponding to Person B and Person C, both The E-mail and The Report are classified as known information.

In some alternative embodiments, where a computer device is associated with a collaboration event participant, such as first user mobile computer device 104, is fitted with a forward facing camera (not shown), also known as a selfie camera, eye tracking technology is utilized to verify, upon accessing a data set, whether visual focus has been directed towards the data set. In some other alternative embodiments, where the computing device is a head mounted display that uses eye tracking as a form of input, the same eye tracking capabilities are used similarly to the previous sentence, to confirm whether visual focus was directed towards the contents of a given data set.

Processing proceeds to operation S270, where shared visual information field display mod 308 displays the classified collaboration event substantive data set as a shared visual information field. In this simplified embodiment, the shared visual information field is a sphere, displayed in the field of view of a user wearing a head mounted display, such as an AR headset, where the contents of data sets classified into different classes at S265 are shown in different portions of the sphere, where each portion is shaded a different color. In this simplified embodiment, the classes of S265 are "known information" and "new information", and respectively represented by a green and red colors for their respective portions of the sphere. Each collaboration event participant wearing a head mounted display would likely see a sphere with different contents in the various portions based on how the data sets were previously classified at S265.

Figure 4A:
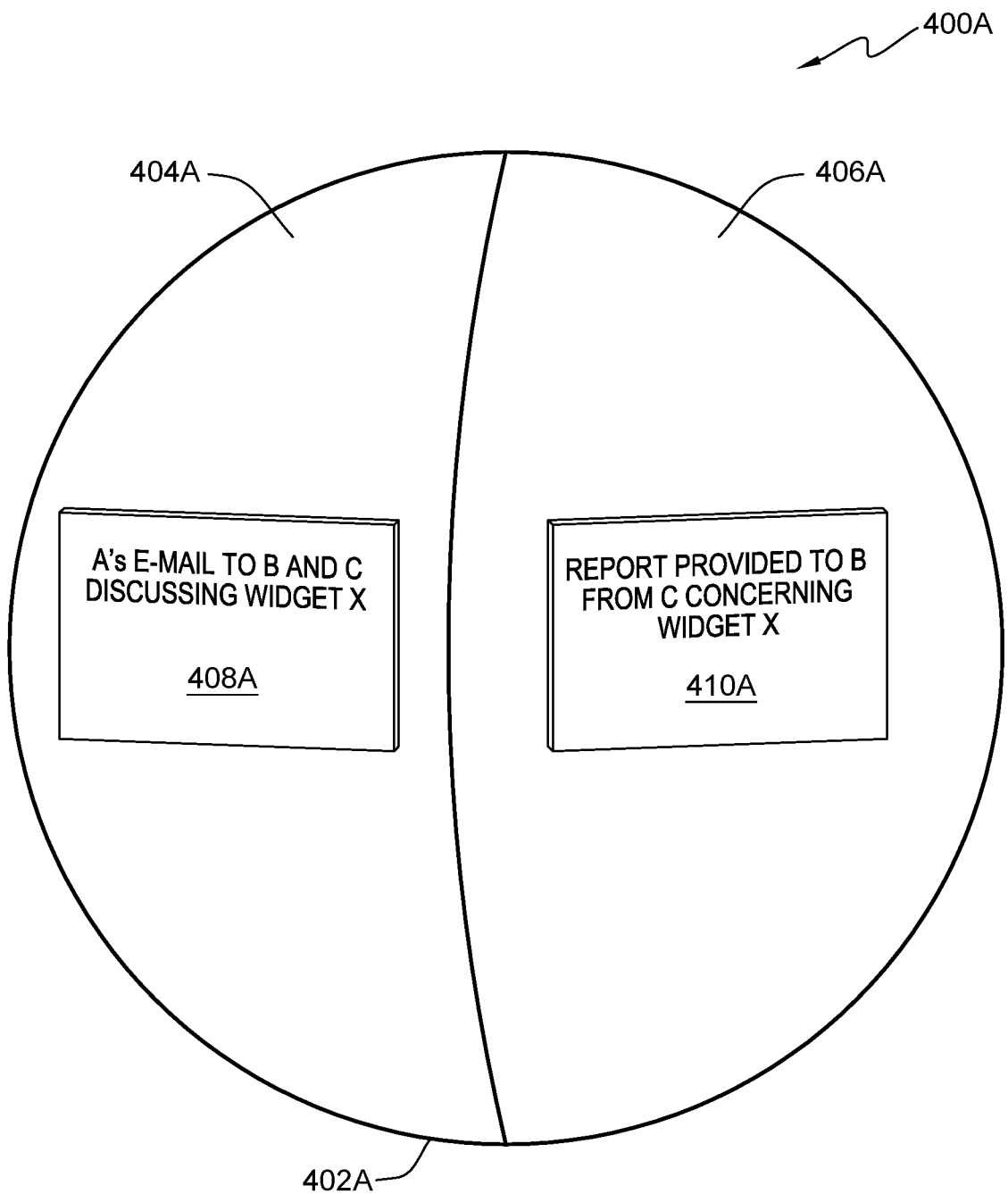
FIG. 4A is a first screenshot view generated by the first embodiment system.
Figure 4B:
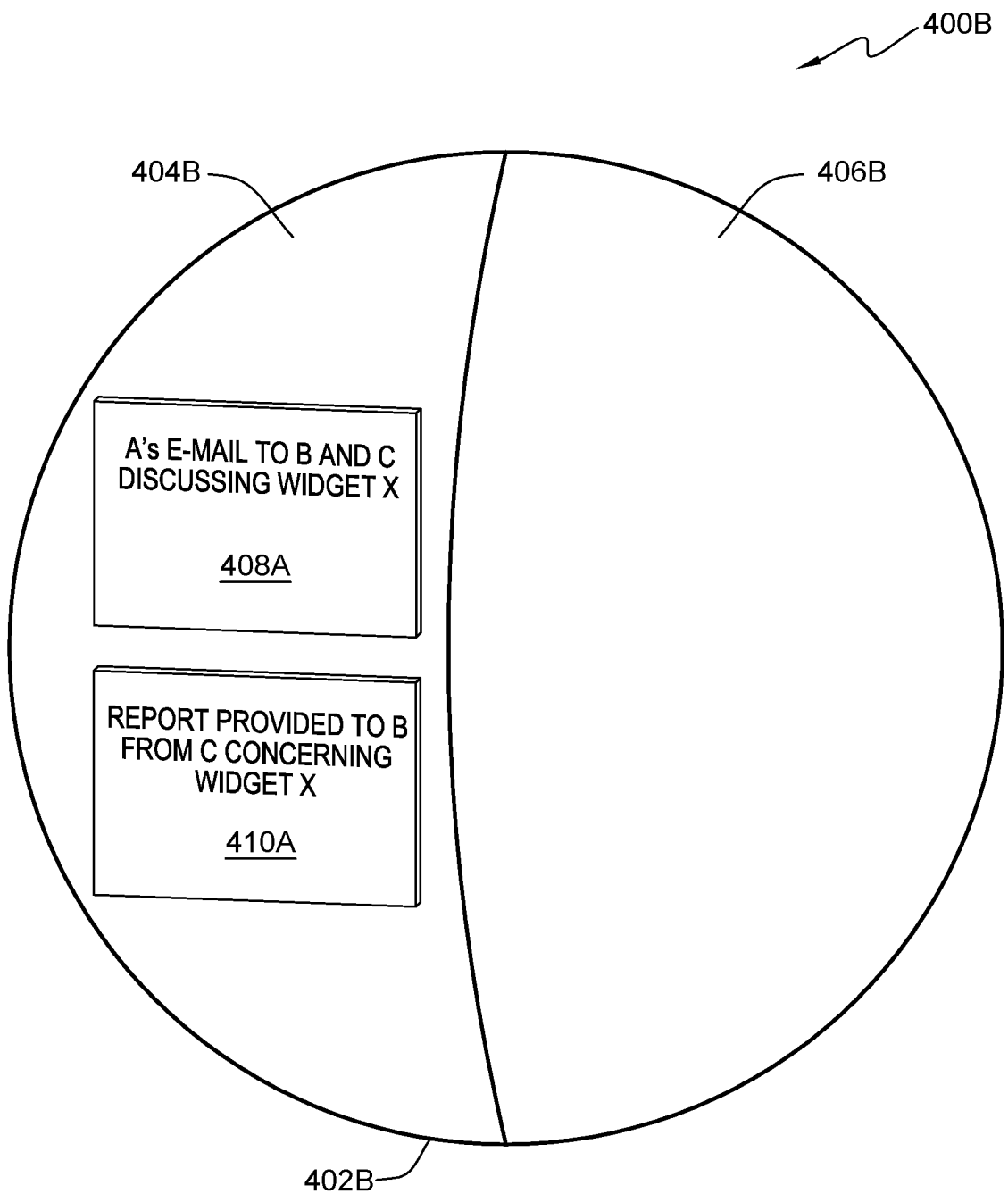
FIG. 4B is a second screenshot view generated by the first embodiment system.

For example, screenshot 400A of FIG. 4A shows an example shared visual information field 402A as displayed to Person A on first user head mounted display 108. Included in shared visual information field 402A is a first portion 404A corresponding to data sets classified as "known information" to Person A (and the unique user account of Person A), a second portion 406A corresponding to data sets classified as "new information" to Person A (and the unique user account of Person A), The E-mail (shown as 408A, classified as "known information" to Person A), and The Report (shown as 410A, classified as "new information" to Person A). Conversely, screenshot 400B of FIG. 4B shows an example shared visual information field 402B as displayed to Person B on second user head mounted display 110. Included in shared visual information field 402B is a first portion 404B corresponding to data sets classified as "known information" to Person B (and the unique user account of Person B), a second portion 406B corresponding to data sets classified as "new information" to Person B (and the unique user account of Person B), The E-mail (shown as 408B, classified as "known information" to Person B), and The Report (shown as 410B, classified as "known information" to Person B). In the context of the shared visual information field, 404A, 404B, 406A, 406B, 408A, 408B, 410A, and 410B all represent different elements of a user interface. As described below, a user may interact with some or all of these elements.

As illustrated in FIGS. 4A and 4B, Person A and Person B are displayed the same contents in the shared visual information field displayed in their respective head mounted displays, but arranged differently so as to highlight information that may be useful to the purpose of the collaboration event, but not yet known to the respective user, and information that is still useful to the purpose of the collaboration event, but already known to the respective user. Arranging the contents of the data sets as such enables each participant of the collaboration event to participate in the collaboration event with the same data sets (and their corresponding contents), but highlights to each respective participant which information is likely new to them without sacrificing other data sets (and their respective contents) that likely provide useful context.

In some alternative embodiments, multiple visual information fields may be displayed simultaneously to a given user on their head mounted display. In some of these alternative embodiments, they are displayed in different portions of the field of view of the user wearing a head mounted display, such as in their peripheral vision area. In some others of these alternative embodiments, the different visual information fields are displayed at different focal depths, such as further behind a first visual information field. The user can bring one of these different visual information fields into their fields of view by directing their visual focus, detected by the head mounted display, to these other visual information fields. By looking in their peripheral vision from an initial eye position, the user is now viewing a different visual information field. Or, by focusing their vision on a different visual information field behind the current visual information field being viewed, the different visual information field is brought forward into focus for viewing by the user, or in some instances by the other users, such that the change in focus by one user might adjust which visual information field is viewed by multiple participant users.

Processing proceeds to operation S275, where user input data store mod 310 receives user input indicating selection of at least one data set of the classified collaboration event substantive data set. In this simplified embodiment, Person A selects The Report, shown as 410A on FIG. 4A, by extending one of their hands out towards 410A and tapping on the visual representation of 410A three times in short succession (also referred to as a "triple tap"). This gesture-type input is recorded by first user head mounted display 108 of FIG. 1. The above are examples of selecting or interacting with user interface elements, where such elements are part of the visual information field. In some alternative embodiments, other types of user input indicating selection of at least one data set of the classified collaboration event substantive data set are used, such as other types of gesture-type input, vocal commands processed using natural language processing and text-to-speech techniques, or selecting a data set on a computer device display by interacting with a touch screen, keyboard, or mouse.

Processing proceeds to operation S280, where substantive data set copying mod 312 copies the selected at least one data set to a first user account. In this simplified embodiment, a copy of The Report, which resides on both network-based cloud storage 112 of FIG. 1 and second user mobile computer device 106, is transferred from network-based cloud storage 112, over network 114, to first user mobile computer device 104, which is associated with the unique user account of Person A. In some alternative embodiments, The Report is transferred to the unique user account of Person A by providing access to the unique user account of Person A to The Report uploaded to network-based cloud storage 112 by Person B and Person C. In another alternative embodiment, The Report is transferred from second user mobile computer device 106 to first user mobile computer device 104 through a near-field communication technique, or any other communication channel directly between second user mobile computer device 106 and first user mobile computer device 104 without intervening computer networking equipment such as a router or signal carrier.

III. Further Comments and/or Embodiments

Some embodiments of the present invention recognize the following facts, potential problems and/or potential areas for improvement with respect to the current state of the art: (i) in various situations, there is a need to share information with multiple people having a common goal; (ii) it means the participating users will be sharing information with physically co-located or virtually co-located users; (iii) different participating users can have different information which one user wants to share with other participating users; (iv) in different situations, when people have a common goal, the participating people often require discussion with each other; (v) this brings up the need that context relevant information should be shared with each other; (vi) thus, there is a need to keep everybody in sync and common information should be shared; (vii) in this scenario, some information is already known to one person and some could be unknown, so it is very difficult to identify which information should be shared with each other, otherwise people will be receiving the same information which is already known to them; and (viii) what is needed is a way by which a system can help users visualize/experience the information distribution among other users in the surrounding.

Some embodiments of the present invention may include one, or more, of the following operations, features, characteristics and/or advantages: (i) an AI, AR and IoT based system and method by which AR glass will create an information field around the visual surrounding; (ii) people present in same information field will be able to visualize the known and unknown information stored with the different participating users in the information field; (iii) and a given user can selectively identify which information is unknown; (iv) Augmented Reality Glass of the users participating in any collaboration (involved in executing common goal), like discussion, meeting and conference, will be collaborating with each other and will be creating visual "information field" in the common "Field of View" for the surrounding; (v) participating users can individually share the information for other users to visualize; (vi) the participating users of the meeting/discussion can be physically or virtually co-located (with VR based meeting, Video call etc.); (vii) the participating users will be identified for the context of the collaboration, then the respective device of the participating user will be sharing information in the common "information field"; (viii) when the information from different participating users is shown in the Visual "information field" of the discussion, the participating users can visualize which information is known, partially known or completely unknown to respective user with appropriate visual icons or indications; (ix) the participating users can selectively pick the information from the visual "information field" and store the same in the user's device (such as their mobile phone); (x) to enable the participating users to be in sync on the information associated to the collaboration; (xi) using AR glass, user can visualize multiple "information fields" present within his "Field of View"; (xii) each "information field" will visually be distinguished with each other so that the participating users can understand the context and associated "information field" in the surrounding; and (xiii) user can move from one "information field" to another "information field" by changing the "Field of View" or the focus distance, and accordingly user can interact with different "information field."

Some embodiments of the present invention may include one, or more, of the following operations, features, characteristics and/or advantages: (i) using content/information classification technique, every information will be classified based on context; (ii) or user can also classify the information based on context; (iii) for classification: (a) NLP techniques, both syntax and semantics, will be used, and (b) random forest based ensemble learning can be used for bagging; (iv) the context can be identified based on how the information can be used in different collaboration activities like meeting, discussion etc., where multiple users are involved; (v) the classified contents and associated permission with the content will be applied, and will be stored with every participating user; (vi) different participating users can have different types of information, in this case some information is known to one or more other users can also be unknown to one or more other users; (vii) the participating users will be using head mounted AR glass; (viii) the combination of AR glass and mobile device of the respective users will recognize the users and known/unknown information (by the user) individually; (ix) the mobile devices are paired with the AR glass of the respective users, and user can visualize the contents through the AR glass; (x) the proposed system will be detecting the participants having common goal or want to discuss together; (xi) devices of the participating users will identify which information is appropriate to any topic of discussion; (xii) this is done based using classification techniques; and (xiii) the participating users AR glass will identify: (a) their respective "Field of View", (b) based on the relative position and direction, the interaction of the participating users' "Field of View" will be identified, and (c) the common or interaction "Field of View".

Some embodiments of the present invention may include one, or more, of the following operations, features, characteristics and/or advantages: (i) the information field will be created on the common "Field of View" of the participating users; (ii) the respective devices of the participating users will be sharing the information associated to the collaboration, in the created "information field" of the participating users; (iii) when the information is shared in the "information field", each of the participating users will be able to view the shared information in the "information field"; (iv) a remote user joins virtually, and the "information field" will be created based in virtual interaction; (v) as required, the shared information on the "information field" is classified based on participating users' context; (vi) the respective devices of the user identify which information is new to a user and which information already known or partially known; (vii) this will be done based on the knowledge corpus of the user which can be stored locally (say, for current context) or on cloud; (viii) the created "information field" classifies the contents based on user's knowledge about the information, so that user can understand which information is to be selected by the user; (ix) a user can selectively pick the information from the "information field" and copy the same in their device; (x) one user can also participate in multiple meetings/discussions, so, in a same visual surrounding or Field of View, the user can have multiple "information fields"; (xi) each "information field" shows context relevant information, so the user can change their focus distance or direction of focus and accordingly can move from one "information field" to another "information field"; (xii) deriving the information based on the context and share it with the users who are part of that context; (xiii) classifying the information in to known and unknown information and allows the user to selectively identify which information is unknown; (xiv) sharing the information by determining the context and the users that belong to the context; (xv) determining the contextual information and share it across multiple AR devices which are in the same context and classifies the information as known and unknown based on the user; and (xvi) contextual information or classification of the contextual information that will be shared across augmented reality devices.

Some embodiments of the present invention may include one, or more, of the following operations, features, characteristics and/or advantages: (i) Augmented Reality Glass of the users participating in any collaboration (involved in executing common goal), like discussion, meeting and conference, collaborating with each other and creating a visual "information field" in the common "Field of View" for the surrounding, where the participating users can individually share the information for other users to visualize; (ii) the participating users of the meeting/discussion can be physically or virtually co-located (with VR based meeting, Video call etc.); (iii) the participating users will be identified for the context of the collaboration, then respective devices of the participating users will share information in the common "information field"; (iv) when the information from different participating users is shown in the Visual "information field" of the discussion, the participating users can visualize which information is known, partially known or completely unknown to respective user with appropriate visual icons or indications; (v) the participating users can selectively pick the information from the visual "information field" and store the same in user's device (like mobile phone); (vi) enable the participating users to be in sync on the information associated to the collaboration; (vii) using AR glass, the user can visualize multiple "information fields" present within their "Field of View" and each "information field" is visually distinguished with each other so that the participating users can understand the context and associated "information field" in the surrounding; (viii) the user can move from one "information field" to another "information field" by changing the "Field of View" or the focus distance; (ix) accordingly user can interact with different "information field"; and (x) an AI, AR and IoT based system and method by which AR glass will be creating information field around the visual surrounding, people present in same information field will be able to visualize the known and unknown information stored with the different participating users in the information field, and user can selectively identify which information is unknown.

Figure 5:
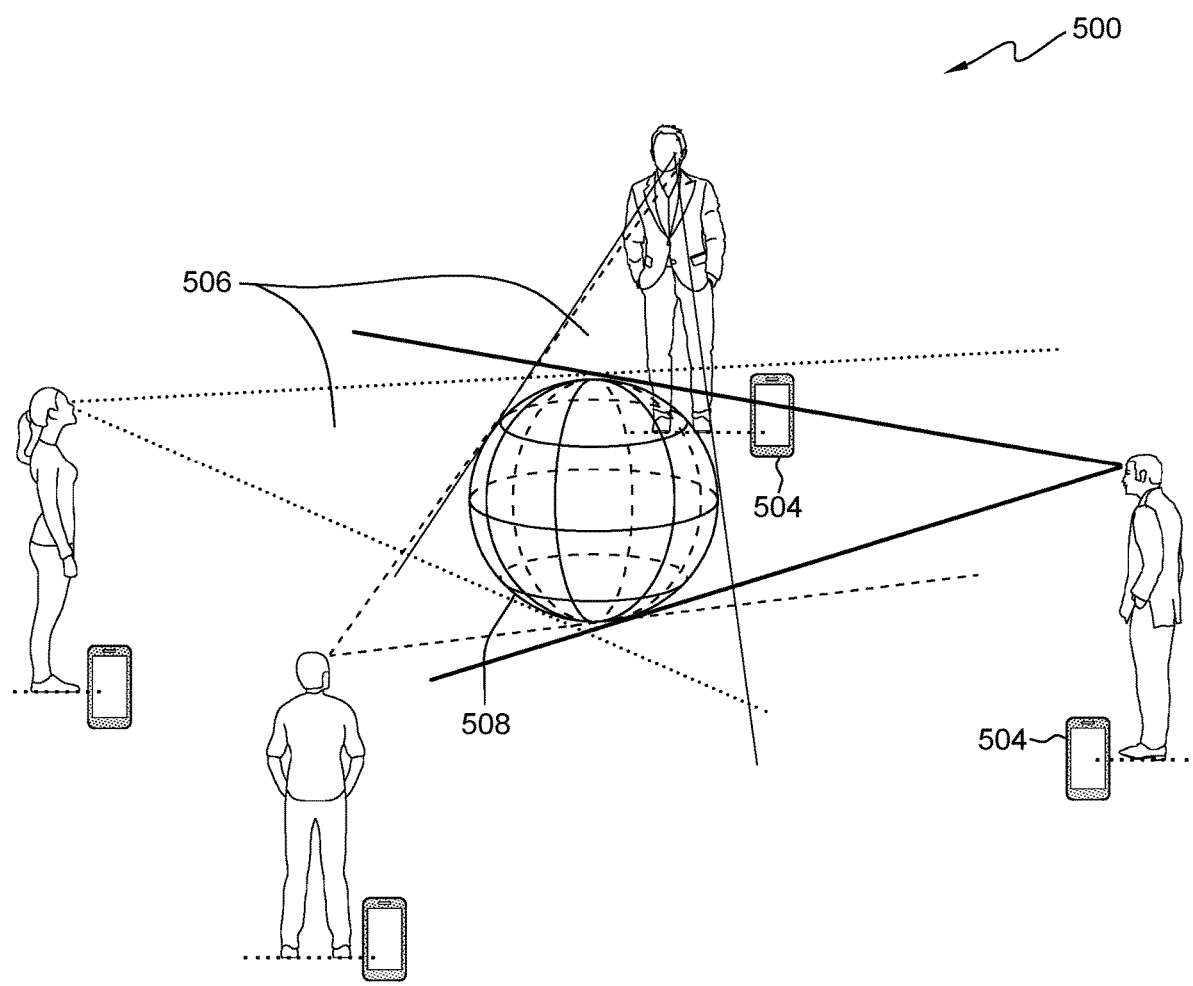
FIG. 5 is a block diagram view of a second embodiment according to the present invention.

Referring to FIG. 5, some embodiments of the present invention include diagram 500, further including: (i) AR glass users 502; (ii) mobile computing devices 504; (iii) individual fields of view 506; and (iv) information field of the participating users 508. Each and every mobile computing device of participating users, such as mobile computing devices 504, respectively includes some information relevant to the information field. Context aware information from mobile computing devices 504 is shared from each mobile computing device to the "information field."

Figure 6:
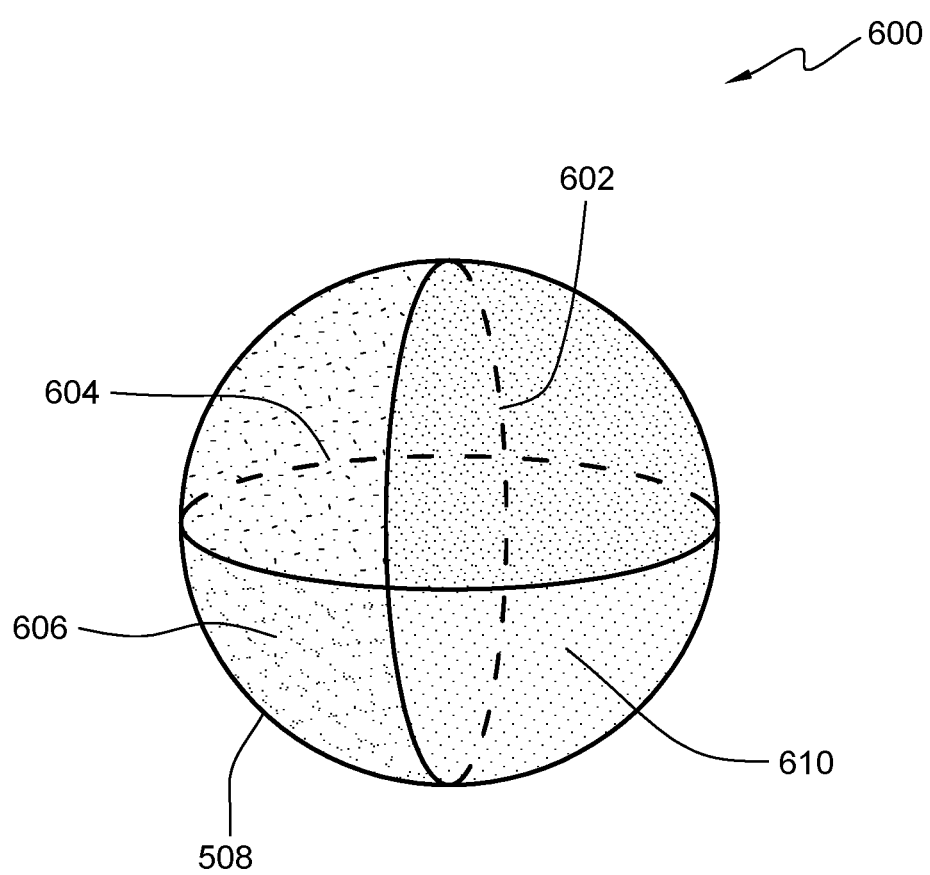
FIG. 6 is a screenshot view generated by the second embodiment system.

Referring to FIG. 6, some embodiments of the present invention include diagram 600, further including: (i) information field 508 (same as information field of the participating users 508 of FIG. 5); (ii) new information 602; (iii) known information 604; (iv) partially known information 606; and (v) obsolete information 610. Every participating individual wearing AR glasses would see a similar arrangement of information, but the contents of 602, 604, 606 and 608 would likely differ for each individual based on the information known to their devices or user accounts. In some alternative embodiments, an additional field corresponding to partially known but obsolete information.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

What is claimed is:

1. A computer-implemented method (CIM) comprising:
   receiving a collaboration context data set including information indicative of a collaboration event and unique user accounts of a plurality of collaboration participants wearing head mounted displays, including a first unique user account associated with a first participant, where the collaboration event is a meeting between the plurality of collaboration participants characterized by a discussion topic;
   receiving a collaboration event substantive data set including a first data set corresponding to the collaboration event from computer devices associated with the unique user accounts of the plurality of collaboration participants based, at least in part, on natural language processing techniques applied to electronic communication messages between the plurality of collaboration participants;
   for the first unique user account, classifying the first data set included in the collaboration event data set as belonging to a first class of a plurality of classes, with the classification of belonging to the first class indicates that the first data set includes historical information previously accessed by the first unique user account;
   receiving user input from the first participant indicating selection of the first data set classified into the first class corresponding to newly introduced information, wherein the user input is a gesture-type input corresponding to interaction with at least one element of the visual representation of the collaboration event substantive data set, the gesture-type input being recorded by the head mounted display; and
   displaying, on the head mounted display of the first participant, a collaboration information field including a visual representation of the collaboration event substantive data set based, at least in part, on the historical information of the first data set, wherein the visual representation of the collaboration event substantive data set includes:
   from the perspective of the first participant, a sphere user interface element subdivided into two or more portions, including a first portion corresponding to the first class and a second portion corresponding to the second class, where data sets in the collaborative event substantive data set are displayed within portions of the sphere user interface element based on their assigned class.

2. The CIM of claim 1 wherein the collaboration event substantive data set further includes a second data set corresponding to the collaboration event from computer devices associated with the unique user accounts of the plurality of collaboration participants, the CIM further comprising:
   for the first unique user account, classifying the second data set included in the collaboration event data set as belonging to a second class of the plurality of classes, with the classification of belonging to the second class indicating that the second data set includes newly introduced information initially received during the collaboration.

3. The CIM of claim 1, further comprising:
   responsive to receiving the user input from the first participant indicating selection of the first data set, providing, over a computer network, a copy of the first data set onto a computer readable storage medium component of a first computer device associated with the first unique user account.

4. The CIM of claim 1, wherein the head mounted displays are selected from the group comprising: (i) augmented reality glasses, and (ii) virtual reality devices.

5. The CIM of claim 1, wherein the plurality of classes further includes a third class corresponding to information that is: (i) partially newly introduced, and (ii) partially previously accessed by the first unique user account.

6. The CIM of claim 1, further comprising:
   displaying, on the head mounted display of the first participant, a second collaboration information field corresponding to a second collaboration event, including a visual representation of a collaboration event substantive data corresponding to the second collaboration event;
   wherein the collaboration information field and the second collaboration information field are displayed at different focal depths from the perspective of the first participant.

7. A computer program product (CPP) comprising:
   a machine readable storage device; and
   computer code stored on the machine readable storage device, with the computer code including instructions for causing a processor(s) set to perform operations including the following:
   receiving a collaboration context data set including information indicative of a collaboration event and unique user accounts of a plurality of collaboration participants wearing head mounted displays, including a first unique user account associated with a first participant, where the collaboration event is a meeting between the plurality of collaboration participants characterized by a discussion topic,
   receiving a collaboration event substantive data set including a first data set corresponding to the collaboration event from computer devices associated with the unique user accounts of the plurality of collaboration participants based, at least in part, on natural language processing techniques applied to electronic communication messages between the plurality of collaboration participants,
   for the first unique user account, classifying the first data set included in the collaboration event data set as belonging to a first class of a plurality of classes, with the classification of belonging to the first class indicates that the first data set includes historical information previously accessed by the first unique user account,
   receiving user input from the first participant indicating selection of the first data set classified into the first class corresponding to newly introduced information, wherein the user input is a gesture-type input corresponding to interaction with at least one element of the visual representation of the collaboration event substantive data set, the gesture-type input being recorded by the head mounted display, and
   displaying, on the head mounted display of the first participant, a collaboration information field including a visual representation of the collaboration event substantive data set based, at least in part, on the historical information of the first data set, wherein the visual representation of the collaboration event substantive data set includes:
   from the perspective of the first participant, a sphere user interface element subdivided into two or more portions, including a first portion corresponding to the first class and a second portion corresponding to the second class, where data sets in the collaborative event substantive data set are displayed within portions of the sphere user interface element based on their assigned class.

8. The CPP of claim 7 wherein the collaboration event substantive data set further includes a second data set corresponding to the collaboration event from computer devices associated with the unique user accounts of the plurality of collaboration participants, and the computer code further includes instructions for causing the processor(s) set to perform the following operations:

for the first unique user account, classifying the second data set included in the collaboration event data set as belonging to a second class of the plurality of classes, with the classification of belonging to the second class indicating that the second data set includes newly introduced information initially received during the collaboration.

9. The CPP of claim 7, wherein the computer code further includes instructions for causing the processor(s) set to perform the following operations:

responsive to receiving the user input from the first participant indicating selection of the first data set, providing, over a computer network, a copy of the first data set onto a computer readable storage medium component of a first computer device associated with the first unique user account.

10. The CPP of claim 7, wherein:
the head mounted displays are selected from the group comprising: (i) augmented reality glasses, and (ii) virtual reality devices; and
the plurality of classes further includes a third class corresponding to information that is: (i) partially newly introduced, and (ii) partially previously accessed by the first unique user account.

11. A computer system (CS) comprising:
a processor(s) set;
a machine readable storage device; and
computer code stored on the machine readable storage device, with the computer code including instructions for causing the processor(s) set to perform operations including the following:

receiving a collaboration context data set including information indicative of a collaboration event and unique user accounts of a plurality of collaboration participants wearing head mounted displays, including a first unique user account associated with a first participant, where the collaboration event is a meeting between the plurality of collaboration participants characterized by a discussion topic, receiving a collaboration event substantive data set including a first data set corresponding to the collaboration event from computer devices associated with the unique user accounts of the plurality of collaboration participants based, at least in part, on natural language processing techniques applied to electronic communication messages between the plurality of collaboration participants, for the first unique user account, classifying the first data set included in the collaboration event data set as belonging to a first class of a plurality of classes, with the classification of belonging to the first class indicates that the first data set includes historical information previously accessed by the first unique user account, receiving user input from the first participant indicating selection of the first data set classified into the first class corresponding to newly introduced information, wherein the user input is a gesture-type input corresponding to interaction with at least one element of the visual representation of the collaboration event substantive data set, the gesture-type input being recorded by the head mounted display; and displaying, on the head mounted display of the first participant, a collaboration information field including a visual representation of the collaboration event substantive data set based, at least in part, on the historical information of the first data set, wherein the visual representation of the collaboration event substantive data set includes:

from the perspective of the first participant, a sphere user interface element subdivided into two or more portions, including a first portion corresponding to the first class and a second portion corresponding to the second class, where data sets in the collaborative event substantive data set are displayed within portions of the sphere user interface element based on their assigned class.

12. The CS of claim 11 wherein the collaboration event substantive data set further includes a second data set corresponding to the collaboration event from computer devices associated with the unique user accounts of the plurality of collaboration participants, and the computer code further includes instructions for causing the processor(s) set to perform the following operations:

for the first unique user account, classifying the second data set included in the collaboration event data set as belonging to a second class of the plurality of classes, with the classification of belonging to the second class indicating that the second data set includes newly introduced information initially received during the collaboration.

13. The CS of claim 11, wherein the computer code further includes instructions for causing the processor(s) set to perform the following operations:

responsive to receiving the user input from the first participant indicating selection of the first data set, providing, over a computer network, a copy of the first data set onto a computer readable storage medium component of a first computer device associated with the first unique user account.

14. The CS of claim 11, wherein:
the head mounted displays are selected from the group comprising: (i) augmented reality glasses, and (ii) virtual reality devices; and
the plurality of classes further includes a third class corresponding to information that is: (i) partially newly introduced, and (ii) partially previously accessed by the first unique user account.

* * * * *